US012313567B2

(12) United States Patent
Liu et al.

(10) Patent No.: US 12,313,567 B2
(45) Date of Patent: May 27, 2025

(54) DETECTION METHOD OF CREASE DEGREE OF SCREEN AND VISUAL DETECTION APPARATUS

(71) Applicant: WUHAN CHINA STAR OPTOELECTRONICS SEMICONDUCTOR DISPLAY TECHNOLOGY CO., LTD., Hubei (CN)

(72) Inventors: Yali Liu, Hubei (CN); Yongzhen Jia, Hubei (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 18/678,928

(22) Filed: May 30, 2024

(65) Prior Publication Data
US 2024/0310295 A1 Sep. 19, 2024

Related U.S. Application Data

(63) Continuation of application No. 17/621,237, filed as application No. PCT/CN2021/133100 on Nov. 25, 2021, now Pat. No. 12,025,570.

(30) Foreign Application Priority Data

Nov. 17, 2021 (CN) .......................... 202111361273.5

(51) Int. Cl.
G01N 21/95 (2006.01)
G01N 21/88 (2006.01)

(52) U.S. Cl.
CPC ..... *G01N 21/9515* (2013.01); *G01N 21/8851* (2013.01); *G01N 2021/8887* (2013.01);
(Continued)

(58) Field of Classification Search
CPC ........... G01N 21/9515; G01N 21/8851; G01N 2021/8887; G01N 2021/9513;
(Continued)

(56) References Cited

U.S. PATENT DOCUMENTS 4,629,319 A 12/1986 Clarke et al.
2019/0287237 A1 9/2019 de Bonfim Gripp et al.

FOREIGN PATENT DOCUMENTS

CN 104331978 A 2/2015
CN 105627942 A 6/2016
(Continued)

OTHER PUBLICATIONS

Chinese Office Action issued in corresponding Chinese Patent Application No. 202111361273.5 dated Jun. 30, 2022, pp. 1-18.
(Continued)

Primary Examiner — Md M Rahman
(74) Attorney, Agent, or Firm — PV IP PC; Wei Te Chung

(57) ABSTRACT

The present application provides a detection method of a crease degree of a screen and a visual detection device, the detection method includes: providing detection rays, and obliquely irradiating the detection rays onto a surface to be measured of the screen; acquiring detection rays reflected by the surface to be measured of the screen to obtain a corresponding light source reflection image; analyzing the light source reflection image to obtain deformation curvatures of the light source reflection image and taking one of a maximum deformation curvature and an average deformation curvature that are obtained through the deformation curva-
(Continued)

tures as an evaluation index of a crease degree of the screen; and evaluating the crease degree of the screen.

19 Claims, 4 Drawing Sheets

(52) U.S. Cl.
CPC ............... *G01N 2021/9513* (2013.01); *G01N 2201/063* (2013.01)

(58) Field of Classification Search
CPC ..... G01N 2201/063; G01N 2021/8829; G01N 21/8806; G01N 21/95; G01N 21/01; G01N 2021/0112
USPC ...................................................... 356/237.2
See application file for complete search history.

(56) References Cited

FOREIGN PATENT DOCUMENTS

| CN | 205718885 U | 11/2016 |
|---|---|---|
| CN | 107607549 A | 1/2018 |
| CN | 107703058 A | 2/2018 |
| CN | 108180868 A | 6/2018 |
| CN | 109557101 A | 4/2019 |
| CN | 109946312 A | 6/2019 |
| CN | 110057835 A | 7/2019 |
| CN | 110261390 A | 9/2019 |
| CN | 110868485 A | 3/2020 |
| CN | 111044517 A | 4/2020 |
| CN | 111273466 A | 6/2020 |
| CN | 111487316 A | 8/2020 |
| CN | 111855671 A | 10/2020 |
| CN | 112150441 A | 12/2020 |
| CN | 112326671 A | 2/2021 |
| CN | 113299213 A | 8/2021 |
| CN | 213902830 U | 8/2021 |
| JP | H10300446 A | 11/1998 |
| JP | 2002202113 A | 7/2002 |
| JP | 2004184397 A | 7/2004 |
| JP | 2005337857 A | 12/2005 |
| JP | 2019152591 A | 9/2019 |
| JP | 2020190441 A | 11/2020 |

OTHER PUBLICATIONS

Chinese Office Action issued in corresponding Chinese Patent Application No. 202111361273.5 dated Jan. 19, 2023, pp. 1-7.
Chinese Rejection Decision issued in corresponding Chinese Patent Application No. 202111361273.5 dated Jun. 19, 2023, pp. 1-8.
International Search Report in International application No. PCT/CN2021/133100, mailed on Jul. 22, 2022.
Written Opinion of the International Search Authority in International application No. PCT/CN2021/133100, mailed on Jul. 22, 2022.
China University of Mining and Technology Press Mar. 31, 2019 Interesting scientific exploration Yuefeng Gao, etc.
Mechanical Science and Technology for Aerospace Engineering vol. 36 Issue 08 Aug. 31, 2017 Detection of Surface Defect on Highly Reflective Curved Surface Using Reflective Fringe Pattern Yuhang Song, etc.
Acta Photonica Sinica vol. 44 Issue 09 Sep. 30, 2015 Test of Optical Mirror Surface Using Fringe Reflection System Ting Yuan, etc.
Laser & Infrared vol. 50 Issue 07 Jul. 31, 2020 The application of laser in the detection of surface defects of high back axle parts Mei Yang, etc.

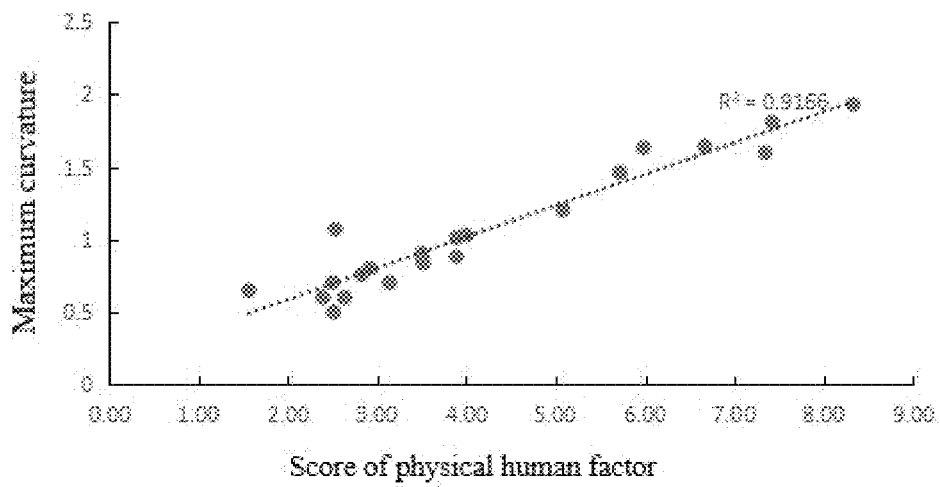
FIG. 7
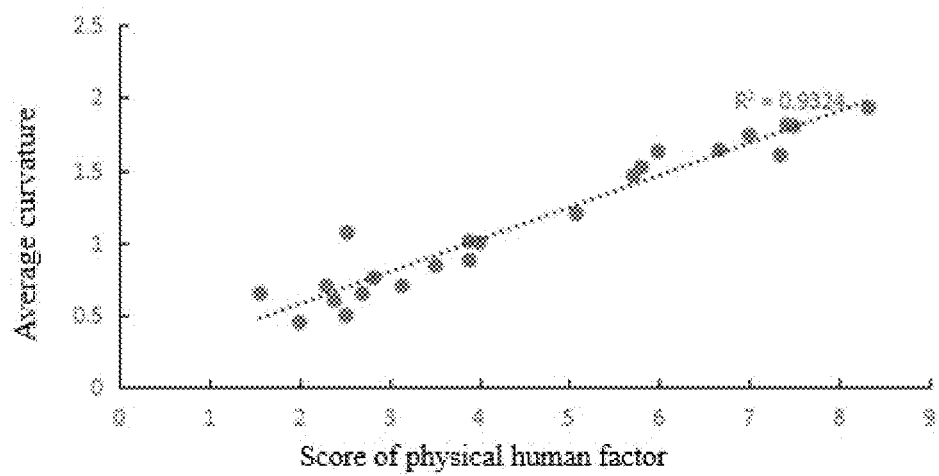
FIG. 8
| Number of bending/k | 0 | 1 | 2 | 5 |
|---|---|---|---|---|
| Light source reflection image | | | | |
| Maximum deformation curvature | 0.647 | 1.449 | 1.643 | 1.822 |
| Average deformation curvature | 0.203 | 0.553 | 0.611 | 0.677 |
FIG. 9

DETECTION METHOD OF CREASE DEGREE OF SCREEN AND VISUAL DETECTION APPARATUS

CROSS-REFERENCE TO RELATED APPLICATIONS

This application is a continuation application of U.S. application Ser. No. 17/621,237, filed on Dec. 21, 2021, which is a US national phase application based upon an International Application No. PCT/CN2021/133100, filed on Nov. 25, 2021, which claims priority to Chinese Patent Application No. 202111361273.5 filed on Nov. 17, 2021. The entire disclosures of the above applications are incorporated herein by reference.

FIELD OF INVENTION

The present application relates to display fields, in particular to a detection method of a crease degree of a screen and a visual detection apparatus.

BACKGROUND OF INVENTION

After a flexible folding screen is bent many times or placed for a long time, the surface of the screen will produce irreversible wrinkles. The wrinkles of the screen are mainly measured by the height difference method in the industry. However, the height difference measurement method does not necessarily match the visual observation effect of human eye. That is, two flexible folding screens may occur, and the folding screen having a smaller height difference of the screen visually perceived by consumers has more obvious screen wrinkles than the folding screen having a larger height difference of the screen.

Therefore, there is a need to develop a measurement method that matches the visual perception results of human eyes, to detect the wrinkle of the screen of the flexible folding screen.

SUMMARY OF INVENTION

The present application provides a detection method of a crease degree of a screen and a visual detection apparatus.

In some embodiments, the present application provides a detection method of a crease degree of a screen, the method including: providing detection rays, and obliquely irradiating the detection rays onto a surface to be measured of the screen; acquiring detection rays reflected by the surface to be measured of the screen to obtain a corresponding light source reflection image; analyzing the light source reflection image to obtain deformation curvatures of the light source reflection image and taking one of a maximum deformation curvature and an average deformation curvature that are obtained through the deformation curvatures as an evaluation index of a crease degree of the screen; and evaluating the crease degree of the screen.

In some embodiments, the present application further provides a visual detection apparatus for detecting a crease degree of a screen, the visual detection apparatus includes a visual detection device and a data processing device. The visual detection device include: a stage for carrying a screen to be detected; a light source disposed above the stage and configured to provide detection rays, the detection rays are configured to be obliquely irradiated onto a surface to be measured of the screen; and a camera disposed above the stage and configured to acquire detection rays reflected by the surface to be measured of the screen to obtain a corresponding light source reflection image. The data processing device is configured to receive the light source reflection image from the camera and includes a processor, the processor is configured to analyze the light source reflection image to obtain deformation curvatures of the light source reflection image, take one of a maximum deformation curvature and an average deformation curvature that are obtained through the deformation curvatures as an evaluation index of a crease degree of the screen, and evaluate the crease degree of the screen.

DESCRIPTION OF DRAWINGS

The technical solutions and other beneficial effects of the present application will be apparent by describing the specific implementations of the present application in detail below in conjunction with the accompanying drawings.

FIG. 7 is a fitting diagram of a first evaluation index of crease degree and a human factor experiment according to an embodiment of the present application.

FIG. 8 is a fitting diagram of a second evaluation index of crease degree and a human factor experiment according to an embodiment of the present application.

FIG. 9 is a graph showing a variation of a light source reflection image and an evaluation index of crease with an increase of the number of bending according to an embodiment of the present application.

DETAILED DESCRIPTION OF EMBODIMENTS

In view of the following problem in the existing height difference measurement method to detect a screen crease degree of a foldable screen: the detection result does not match the visual observation effect of human eyes, the present application provides a visual detection device and a method of detecting a screen crease degree implemented by the visual detection device, which may be used to solve this problem.

Figure 1:
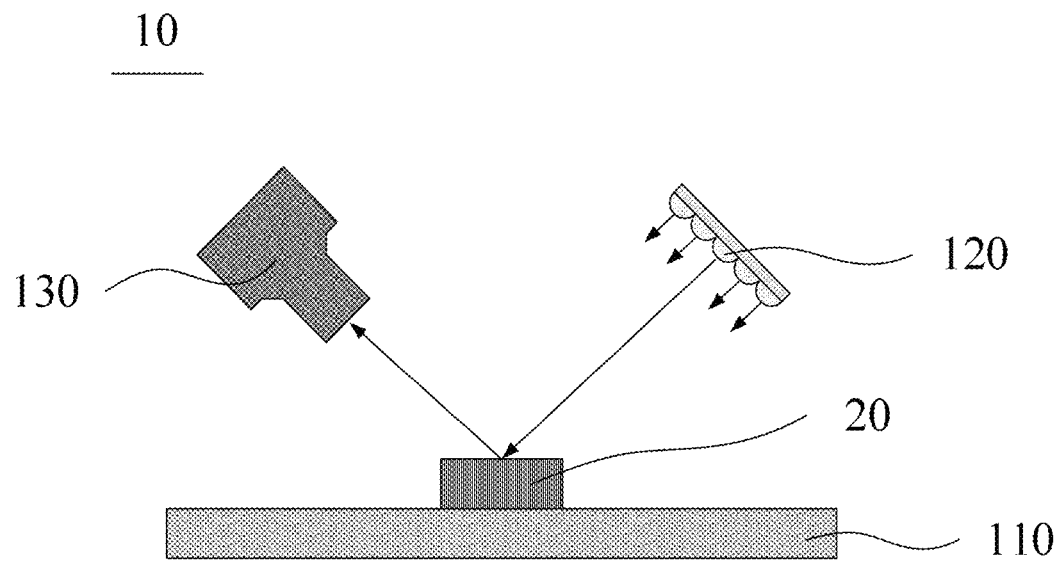
FIG. 1 is a schematic principle diagram of a visual detection device according to an embodiment of the present application.
Figure 2:
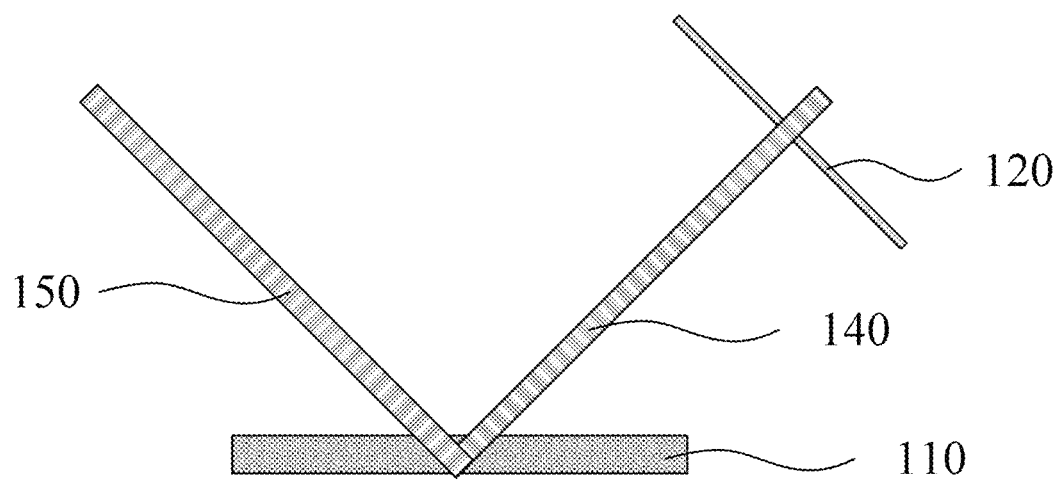
FIG. 2 is a schematic structural front view of a visual detection device according to an embodiment of the present application.
Figure 3:
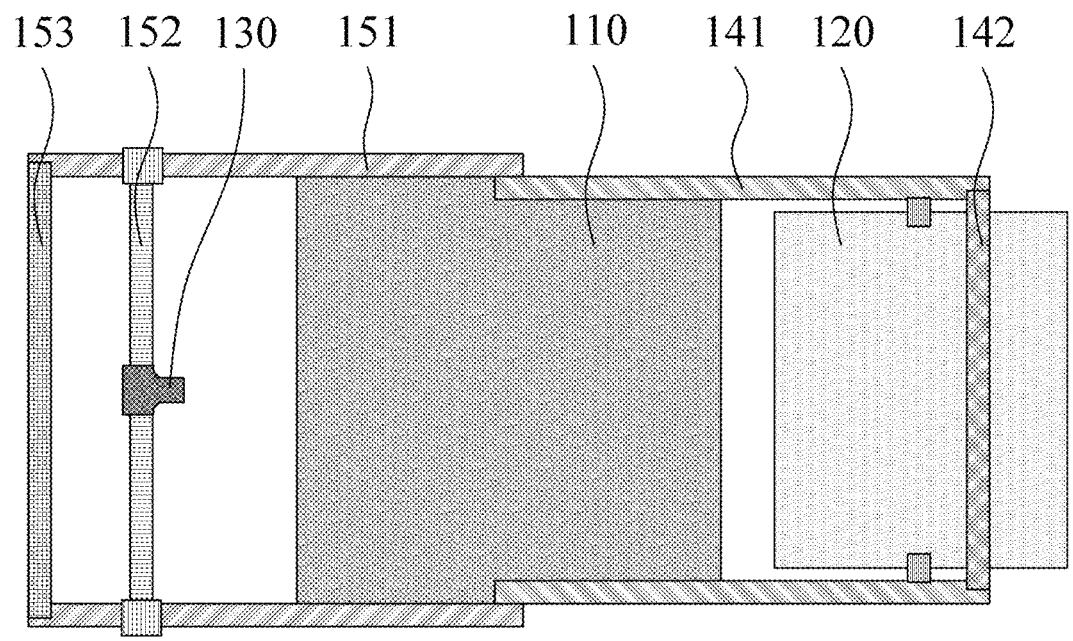
FIG. 3 is a schematic structural top view of a visual detection device according to an embodiment of the present application.

In an embodiment, referring to FIGS. 1 to 3, FIG. 1 is a schematic principle diagram of a visual detection device according to an embodiment of the present application, FIG. 2 is a schematic structural front view of a visual detection device according to an embodiment of the present application, FIG. 3 is a schematic structural top view of a visual detection device according to an embodiment of the present application. As shown in drawings, the visual detection device 10 provided by an embodiment of the present application includes:

a stage 110 for carrying an object 20 to be detected;

a light source 120 disposed above the stage 110, using for providing detection rays (or detection light) obliquely irradiating a surface to be measured of the object 20;

a camera 130 disposed above the stage 110 and used to acquire detection rays reflected from the surface to be measured of the object 20.

In an embodiment, the visual detection device further includes a first support arm 140 for supporting the light source 120 and a second support arm 150 for supporting the camera 130.

In an embodiment, the first support arm 140 includes two first support rods 141 which are parallel to each other. One ends of the two first support rods 141 are respectively connected to both sides of the stage 110, and each of the two first support rods 141 can rotate with the connected end as a rotation center, thereby adjusting an included angle between the first support rods 141 and the stage 110, and further adjusting an included angle between the light emitting surface of the light source 120 and a loading surface of the stage 110. The other ends of the two first support rods 141 are respectively connected to both sides of the light source 120. The light source 120 may be vertically connected to the first support rods 141 or may be obliquely connected to the first support rods 141. Further, both sides of the light source 120 are slidably connected to the first support rods 141, that is, the light source 120 can perform a sliding motion parallel to the first support rods 141 with respect to the first support rods 141, thereby adjusting the distance between the light source 120 and the stage 110.

The first support arm 140 may further include a second support rod 142, the other ends of the two first support rods 141 are fixedly connected to the second support rod 142, the second support rod 142 further improves the stability of the first support arm 140.

In an embodiment, the second support arm 150 includes two third support rods 151 parallel to each other. One ends of the third support rods 151 are rotatably connected to the stage 110. The two third support rods 151 are respectively connected to both sides of the stage 110, and each of the two third support rods 151 can rotate with the connected end as a rotation center, thereby adjusting an included angle between the third support rods 151 and the stage 110, and further adjusting an included angle between the camera 130 and the loading surface of the stage 110. Further, the third support rods 151 are linked to the first support rods 141, that is, when the first support rod 141 is rotated and adjusted, the third support rod 151 rotates accordingly; when the third support rod 151 is rotated and adjusted, the first support rod 141 rotates accordingly; this ensures that the light emitted from the light source 120 at any angle can be captured by the camera 130 after being reflected by the object 20.

The second support arm 150 further includes a fourth support rod 152 on which the camera 130 is disposed. The fourth support rod 152 is parallel to the loading surface of the stage 110. Both ends of the fourth support rod 152 are respectively connected to two third support rods 151, and may be perform a sliding motion parallel to the third support rods 151 with respect to the third support rods 151, thereby adjusting the distance between the camera 130 and the stage 110. Further, the camera 130 is slidably disposed on the fourth support rod 152, that is, the camera 130 may slidably move on the fourth support rod 152 parallel to the loading surface of the stage 110, thereby adjusting the relative position of the camera 130 with respect to the object 20.

The second support arm 150 may further include a fifth support rod 153, the fifth support rod 153 is parallel to the fourth support rod 152, and the other ends of the two third support rods 151 are fixedly connected to the fifth support rod 153, which further improves the stability of the second support arm 150.

The present embodiment further provides a detection method of a crease degree of a screen, the steps of which are implemented by the visual detection device shown in FIGS. 1 and 2 and provided in the embodiment of the present application. The test environment of the detection method was a dark state, the test temperature was 5° C.±3° C., the test humidity was between 25% and 85%, and the test pressure was between 86 kPa and 106 kPa.

Figure 4:
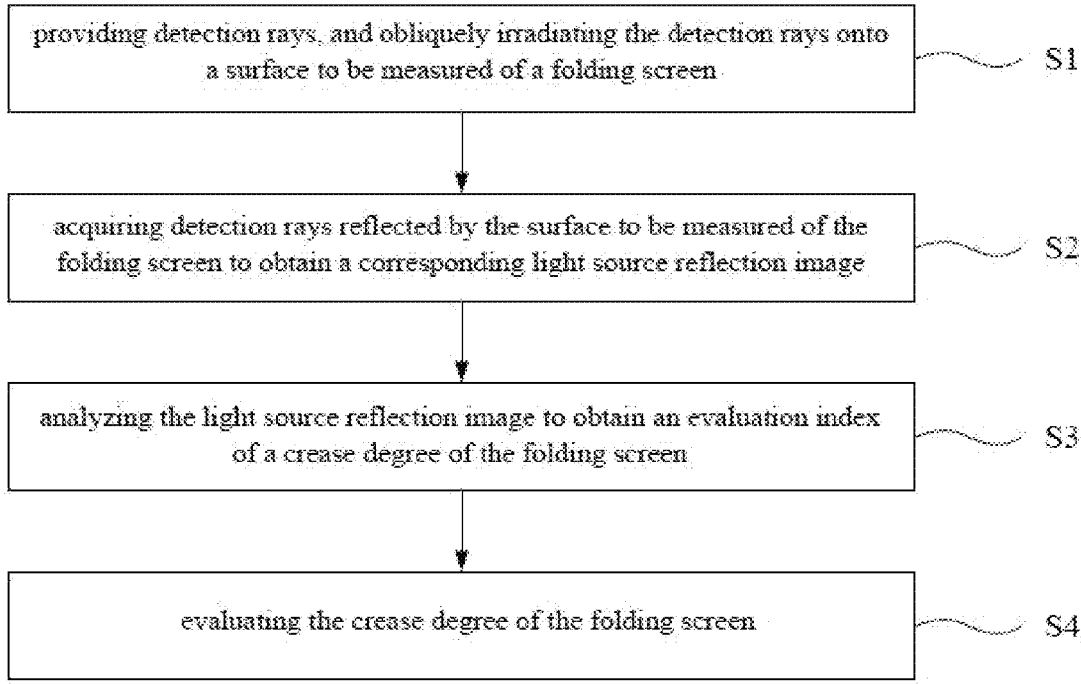
FIG. 4 is a third flowchart of a detection method of a crease degree of a screen according to an embodiment of the present application.

In an embodiment, referring to FIG. 4, FIG. 4 shows a flowchart of a detection method of a crease degree of a screen according to an embodiment of the present application. As shown in FIG. 4, the detection method includes:

S1. providing detection rays, and obliquely irradiating the detection rays onto a surface to be measured of a folding screen;

S2: acquiring detection rays reflected by the surface to be measured of the folding screen to obtain a corresponding light source reflection image;

S3, analyzing the light source reflection image to obtain an evaluation index of a crease degree of the folding screen; and S4. evaluating the crease degree of the folding screen.

In an embodiment of the present application, the folding screen is irradiated obliquely by the detection rays, the detection rays reflected by the folding screen are acquired, an image algorithm analysis is performed on the light source reflection image to obtain the corresponding evaluation index of the crease degree of the folding screen, and then the crease degree of the folding screen is evaluated. The evaluation index of the crease degree obtained in the embodiment of the present application matches the visual effect of human eyes, which solves the problem that the conventional measurement method of the crease degree of the folding screen does not match the visual perception result of human eyes in the scene of observing in an oblique direction.

Figure 5:
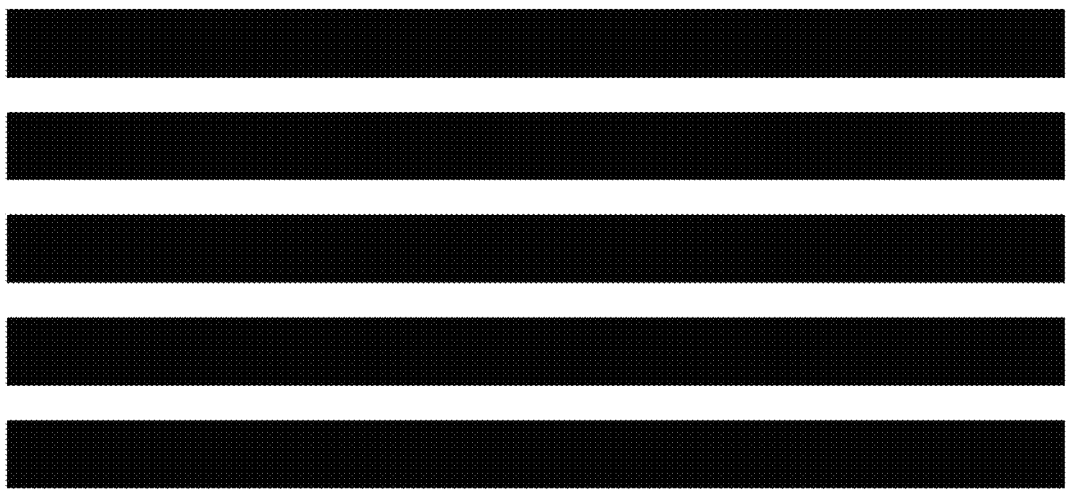
FIG. 5 is a schematic diagram of a light source according to an embodiment of the present application.

Specifically,

Referring to FIG. 1, in step S1, a step of providing a detection rays and obliquely irradiating the detection rays onto the folding screen includes:

a stripe light-spot is used as a detection light source to emit detection rays. The detection rays propagate obliquely downward as shown in FIG. 1 and illuminate the folding screen. Referring to FIG. 5, FIG. 5 shows a schematic diagram of a light source according to an embodiment of the present application, that is, a schematic diagram of the stripe light-spot. In an embodiment of the present application, a radius size of a light-spot stripe of the stripe light-spot ranges from (1 mm×1 mm) to (3 mm×3 mm), and a gap between the light-spot stripes ranges from 1 mm to 3 mm. The embodiment of the present application is applicable to a scene in which a folding screen is viewed obliquely by a human eye.

Referring to FIG. 1, in the step S2, a step of acquiring the detection rays reflected by the folding screen to obtain the corresponding light source reflection image includes:

the detection rays irradiated onto the folding screen are reflected by the surface to be measured of the folding screen. Wherein the direction along which the light-spot stripe of the stripe light-spot irradiated onto the folding screen extends is perpendicular to a crease direction of the folding screen. In an embodiment of the present application, the folding screen remains in a blank screen state to avoid interference of the light of the folding screen on the detection rays.

Figure 6:
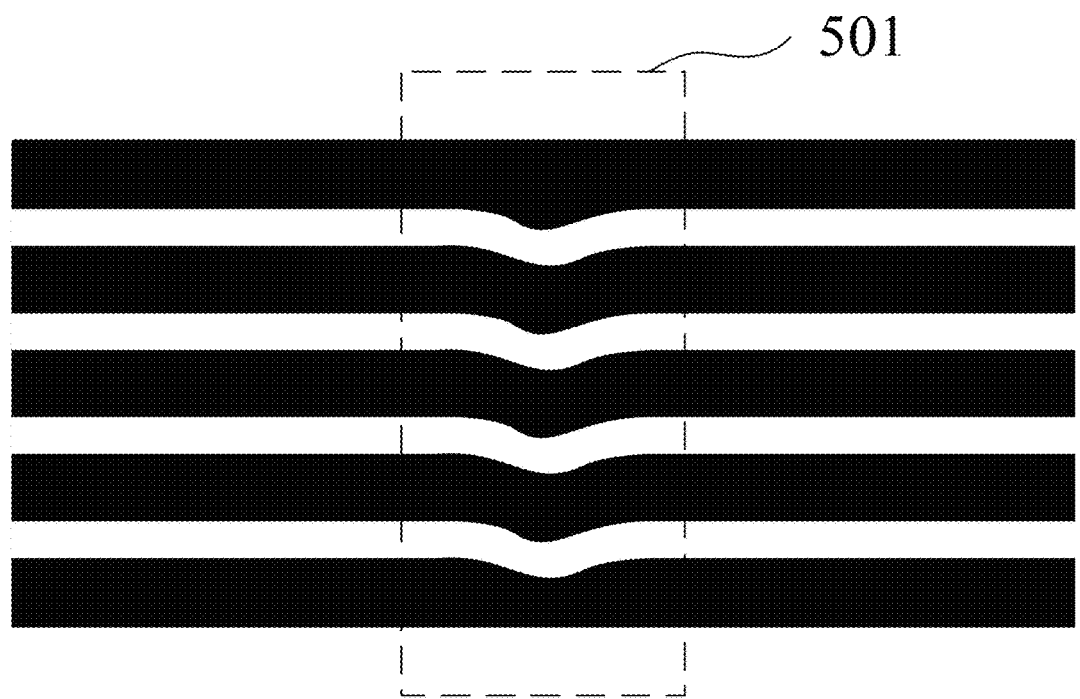
FIG. 6 is a schematic diagram of a light source reflection image according to an embodiment of the present application.

The detection rays reflected by the surface to be measured of the folding screen are acquired by the camera, and the camera performs imaging according to the acquired detection rays to obtain a corresponding light source reflection image. Referring to FIG. 6, FIG. 6 shows a schematic diagram of a light source reflection image according to an embodiment of the present application. As shown in FIG. 6, in a folding area 501 of a folding screen, the light-spot stripes are bent and deformed.

In an embodiment, in step S3, a step of analyzing the light source reflection image to obtain the evaluation index of the crease degree of the folding screen includes:

the deformation curvatures of the light-spot stripes in the light source reflection image are obtained by an image algorithm; specifically, the deformation curvatures of the light-spot stripes are calculated by an arc differential algorithm. Wherein, the deformation curvature of the light-spot stripe is the rotation rate of the tangential direction angle of a certain point on the light-spot stripe with respect to the arc length, and indicates the degree to which the light-spot stripe curve deviates from the straight line, and the numerical value of the deformation curvature is the numerical value of the bending degree of the light-spot stripe curve at a certain point.

A maximum value of the deformation curvatures is taken as the evaluation index of the crease degree of the folding screen. The greater the value of the maximum deformation curvature, the greater the crease degree of the folding screen, the smaller the value of the maximum deformation curvature, and the smaller the crease degree of the folding screen.

Referring to FIG. 7, FIG. 7 shows a fitting diagram of the maximum deformation curvature of the light-spot stripes and the human factor experiment according to an embodiment of the present application. Wherein the fitting value is $R2=0.9166$, and the fitting value is close to 1, which proves that the detection method of the screen crease degree provided in this embodiment has a good match with the visual effect of human eyes. FIG. 9 is a graph showing a variation of a light source reflection image and the maximum deformation curvature with an increase of the number of bending according to an embodiment of the present application. Wherein as the number of bending increases, the value of the average deformation curvature gradually decreases, which further proves that the detection method of the crease degree of the screen provided in the present embodiment has a good match with the visual effect of human eyes.

Referring to FIG. 7, in step S4, a step of evaluating the crease degree of the folding screen includes: when the score of the physical human factor is 0 (that is, the maximum deformation curvature is 0), the folding screen has no crease (or wrinkle); when the score of the physical human factor is 0-3 (not including 0), the folding screen has slight creases; when the score of the physical human factor is 3-6 (not including 3), the folding screen has more obvious creases; when the score of the physical human factor is 6-10 (not including 6), the folding screen has serious creases.

In an embodiment, in step S3, a step of analyzing the light source reflection image to obtain the evaluation index of the crease degree of the folding screen includes:

deformation curvatures of the light-spot stripes in the light source reflection image are obtained by the image algorithm.

An average deformation curvature is calculated, and the average deformation curvature is taken as the evaluation index of the crease degree of the folding screen; the larger the value of the average deformation curvature, the larger the crease degree of the folding screen, the smaller the value of the average deformation curvature, and the smaller the crease degree of the folding screen.

Referring to FIG. 8, FIG. 8 shows a fitting diagram of the average deformation curvature of the light-spot stripes and the human factor experiment according to the present embodiment. Wherein the fitting value $R2=0.9324$, and the fitting value is close to 1, which proves that the detection method of the screen crease degree provided in this embodiment has a good match with the visual effect of human eyes. FIG. 9 is a graph showing a variation of a light source reflection image and the average deformation curvature with an increase of the number of bending according to an embodiment of the present application. Wherein as the number of bending increases, the value of the average deformation curvature gradually decreases, which further proves that the detection method of the crease degree of the screen provided in the present embodiment has a good match with the visual effect of human eyes.

Referring to FIG. 8, a step of evaluating the crease degree of the folding screen includes: when the score of the physical human factor is 0 (that is, the maximum deformation curvature is 0), the folding screen has no crease (or wrinkle); when the score of the physical human factor is 0-3 (not including 0), the folding screen has slight creases; when the score of the physical human factor is 3-6 (not including 3), the folding screen has more obvious creases; when the score of the physical human factor is 6-10 (not including 6), the folding screen has serious creases.

In summary, an embodiment of the present application provides a detection method of a crease degree of a screen and a visual detection device. The detection method includes: providing detection rays, and obliquely irradiating the detection rays onto a surface to be measured of the folding screen; acquiring detection rays reflected by the surface to be measured of the folding screen to obtain a corresponding light source reflection image; analyzing the light source reflection image to obtain an evaluation index of a crease degree of the folding screen; evaluating the crease degree of the folding screen. The folding screen is irradiated obliquely by the detection rays, the detection rays reflected by the folding screen are acquired, an image algorithm analysis is performed on the light source reflection image to obtain the corresponding evaluation index of the crease degree of the folding screen, and then the crease degree of the folding screen is evaluated. The evaluation index of the crease degree obtained in the embodiment of the present application matches the visual effect of human eyes, which solves the problem that the conventional measurement method of the crease degree of the folding screen does not match the visual perception result of human eyes in the scene of observing in an oblique direction.

The detection method of the crease degree of the screen and the visual detection device provided in the embodiments of the present application are described in detail above. Specific examples are used in this article to illustrate the principles and implementations of the present disclosure. The description of the embodiments is merely intended to help understand the methods and core ideas of the present application. At the same time, a person skilled in the art may make changes in the specific embodiments and application scope according to the idea of the present application. In conclusion, the content of the specification should not be construed as a limitation to the present application.

What is claimed is:

1. A detection method of a crease degree of a screen, comprising following steps:
   providing detection rays, and obliquely irradiating the detection rays onto a surface to be measured of the screen;
   acquiring detection rays reflected by the surface to be measured of the screen to obtain a corresponding light source reflection image;
   analyzing the light source reflection image to obtain deformation curvatures of the light source reflection image and taking one of a maximum deformation curvature and an average deformation curvature that are obtained through the deformation curvatures as an evaluation index of a crease degree of the screen, comprising:
      obtaining the deformation curvatures of the light-spot stripes in the light source reflection image by an image algorithm; and
      calculating the average deformation curvature, wherein the average deformation curvature is the evaluation index of the crease degree of the screen; and
   evaluating the crease degree of the screen.

2. The detection method of the crease degree of the screen according to claim 1, wherein the screen is a foldable screen, and the surface to be measured of the screen is arranged in a foldable area of the foldable screen.

3. The detection method of the crease degree of the screen according to claim 1, wherein a light source for providing the detection rays is a stripe light-spot.

4. The detection method of the crease degree of the screen according to claim 3, wherein the stripe light-spot has a size ranging from (1 mm×1 mm) to (3 mm×3 mm), and a gap between two adjacent light-spot stripes ranges from 1 mm to 3 mm.

5. The detection method of the crease degree of the screen according to claim 3, wherein a direction along which the light-spot stripe extends is perpendicular to a creasing direction of the screen.

6. The detection method of the crease degree of the screen according to claim 5, wherein the step of analyzing the light source reflection image to obtain the deformation curvatures of the light source reflection image and taking one of the maximum deformation curvature and the average deformation curvature that are obtained through the deformation curvatures as the evaluation index of the crease degree of the screen comprises:
   obtaining the deformation curvatures of the light-spot stripes in the light source reflection image by an image algorithm; and
   taking the maximum value of the deformation curvatures as the evaluation index of the crease degree of the screen.

7. The detection method of the crease degree of the screen according to claim 6, wherein the crease degree of the screen increases as a value of the maximum deformation curvature increases.

8. The detection method of the crease degree of the screen according to claim 1, wherein the crease degree of the screen increases as a value of the average deformation curvature increases.

9. The detection method of the crease degree of the screen according to claim 1, wherein the folded screen is in a blank screen state.

10. The detection method of the crease degree of the screen according to claim 1, wherein a test environment is a dark state, a test temperature is 5° C.±3° C., a test humidity is between 25% and 85%, and a test pressure is between 86 kPa and 106 kPa.

11. A visual detection apparatus for detecting a crease degree of a screen, comprising:
   a visual detection device comprising:
      a stage for carrying a screen to be detected;
      a light source disposed above the stage and configured to provide detection rays, wherein the detection rays are configured to be obliquely irradiated onto a surface to be measured of the screen; and
      a camera disposed above the stage and configured to acquire detection rays reflected by the surface to be measured of the screen to obtain a corresponding light source reflection image; and
   a data processing device configured to receive the light source reflection image from the camera and comprising a processor, wherein the processor is configured to analyze the light source reflection image to obtain deformation curvatures of the light source reflection image, take one of a maximum deformation curvature and an average deformation curvature that are obtained through the deformation curvatures as an evaluation index of a crease degree of the screen, and evaluate the crease degree of the screen,
   wherein the analyzing and the taking comprise:
      obtaining the deformation curvatures of the light-spot stripes in the light source reflection image by an image algorithm; and
      calculating the average deformation curvature, wherein the average deformation curvature is the evaluation index of the crease degree of the screen.

12. The visual detection apparatus according to claim 11, wherein the light source providing the detection rays is a stripe light-spot.

13. The visual detection apparatus according to claim 12, wherein the object is a foldable screen, the surface to be measured of the screen is arranged in a foldable area of the foldable screen, and a direction along which the light-spot stripe extends is perpendicular to a creasing direction of the foldable screen.

14. The visual detection apparatus according to claim 11, wherein the visual detection device further comprises a first support arm and a second support arm, the first support arm is used for supporting the light source, and the second support arm is used for supporting the camera.

15. The visual detection apparatus according to claim 14, wherein the first support arm is rotatable with respect to the stage to adjust an included angle between a light emitting surface of the light source and a loading surface of the stage; and the second support arm is rotatable with respect to the stage to adjust an included angle between the camera and the loading surface.

16. The visual detection apparatus according to claim 15, wherein the first support arm is linked to the second support arm so as to ensure that rays emitted from the light source at any angle are acquired by the camera after being reflected by the surface to be measured of the object.

17. The visual detection apparatus according to claim 15, wherein the first support arm comprises two first support rods parallel to each other and a second support rod, one ends of the two first support rods are respectively connected to both sides of the stage, and both ends of the second support rod are fixedly connected to other ends of the two first support rods, respectively; and
   wherein both sides of the light source are slidably connected to the first support rods.

18. The visual detection apparatus according to claim 15, wherein the second support arm comprises two third support rods parallel to each other and a fourth support rod, one ends of the two third support rods are connected to both sides of the stage respectively, both ends of the fourth support rod are respectively connected to the two third support rods, and the camera is disposed on the fourth support rod, and
 wherein both sides of the camera are slidably connected to the third support rods.

19. The visual detection apparatus according to claim 18, wherein the fourth support rod is parallel to the stage, and the camera is slidably connected to the fourth support rod.

* * * * *